United States Patent [19]
Gaydon et al.

[11] 4,320,245
[45] Mar. 16, 1982

[54] PROCESS AND APPARATUS FOR ARC CONTROL IN ARC FURNACES

[75] Inventors: Jean P. Gaydon, Marly le Roi; Claude Haglon, La Garenne, both of France

[73] Assignee: BBC Brown, Boveri & Company, Limited, Baden, Switzerland

[21] Appl. No.: 169,463

[22] Filed: Jul. 16, 1980

[30] Foreign Application Priority Data

Jul. 17, 1979 [FR] France .................. 79 18726

[51] Int. Cl.³ ........................................... H05B 7/144
[52] U.S. Cl. ........................................... 13/12; 13/13
[58] Field of Search ............................... 13/12, 13

[56] References Cited

U.S. PATENT DOCUMENTS 3,431,344  3/1969  Borrebach ................. 13/13 X
3,963,978  6/1976  Kelley, Jr. et al. ......... 13/12 X
3,968,422  7/1976  Waldmann ................. 13/12 X
4,254,298  3/1981  Svendsen .................. 13/12

Primary Examiner—Roy N. Envall, Jr.
Attorney, Agent, or Firm—Oblon, Fisher, Spivak, McClelland & Maier

[57] ABSTRACT

A process and an apparatus for arc control in electric arc furnaces is disclosed. The position of a movable electrode in the furnace is controlled based upon a measured electrical characteristic of the arc. The arc voltage supplied to the electrode is controlled independently of the electrode position and is based upon at least one electrical characteristic of the arc. The invention is applicable to both AC and DC furnaces.

7 Claims, 5 Drawing Figures

PROCESS AND APPARATUS FOR ARC CONTROL IN ARC FURNACES

BACKGROUND OF THE INVENTION

1. Field of the Invention

The present invention relates in general to a novel process and apparatus for arc control in an electric arc furnace.

2. Description of the Prior Art

It is known that optimal performance of the melting and refining processes in arc furnaces requires rapid and accurate control of the arc. In fact, good arc stability is an important factor in the efficient use of power capacity, in limiting disturbances in the electric power system, and in reducing electrode wear.

In the melting period, the arc must be fed at full power, with good output, and must be reestablished very quickly after a failure or a short-circuit due to a very rapid displacement. In the refining period, penetration of the electrode into the bath must be avoided so as not to induce possible carburization; therefore, accurate control must be available. Finally, in periods of transition, i.e., in mixed solid-liquid phase, one is confronted simultaneously with the preceding constraints.

Up to the present time, adjustment of the arc has consisted of an adjustment of its impedance, or possibly its power, measured from its voltage and its current, by means of the displacement of the electrode or electrodes, which enables a great variation in the adjustment parameters. A major drawback of conventional devices using this method is that they use a combined pneumatic, hydraulic, mechanical, or electrical apparatus having non-negligible time constants and errors. Under these conditions, one must accept a compromise in arc control between speed and precision, both in the melting and refining periods.

Furthermore, arc stability is improved by accepting rather high line impedances, which reduce the power factor of the installation and thus its efficiency, due to the additional line losses which result.

The position of the arc is essentially variable as a function of:

the arrangement of the scrap iron before or during melting;
the level of the liquid metal after melting;
the wear of the electrodes.

A high positioning of the electrodes, with a wide range of adjustment, is therefore indispensable in all cases.

SUMMARY OF THE INVENTION

One characteristic of the present invention is that it combines electrode position control with a control effected directly upon the power supply of the arc in order to ensure accuracy and speed, and therefore solely on electrical quantities, which enables the various constraints to be easily met. The control quantity is the voltage of the arc. It is made to vary by means of control elements, or converters, having thyristors, placed in the power supply at the primary or secondary windings of the transformer.

An additional advantage of the process is that it is possible for the thyristor converter to assume, in addition to its normal role of adjustment, the function of a rapid static switch, which may be advantageously used in the case of a short-circuit or for reasons of safety, for example.

Another important advantage of the process is that it enables the reduction of line impedances. In the case of a furnace supplied with alternating voltage at an industrial frequency (e.g., 50 or 60 Hz), the thyristor converter is preferentially mounted in grades, i.e., so as to transform an alternating voltage of a set effective value into an alternating voltage of a continually variable effective value. It is mounted at the primary or secondary winding of the power transformer.

The most frequently used method for varying the voltage is to cut off portions of the voltage waveform by delaying conduction after the moment of natural ignition, i.e., by adjusting the value of the ignition delay angle of the thyristor. This method is entirely analogous to the one long practiced for the control of heat from resistance-furnaces.

Feeding arc furnaces with direct current is a relatively new technique having great advantages, with which the present invention may be combined so as to offer optimum attractiveness. Two embodiments are presented which illustrate applications of the present invention in such a case. In the first embodiment, the voltage is rectified by a diode rectifier placed at the secondary winding of the transformer, and is varied through the delayed conduction of thyristors mounted in grades at the primary winding. In the second case, the thyristor converter is mounted in the secondary winding of the transformer and simultaneously ensures the rectification of the voltage and its variation through delayed conduction.

An important and original characteristic of the process of the present invention results from the combination of:

rapid direct control of the arc through the power supply;
indirect control through the movement of electrodes, which is slow in continuous operation.

This enables, in particular, the pairing of high performance arc control, guaranteeing great stability and thus good efficiency, energy savings, and reduced disturbances in the power supply system, with an electrode positioning capable of being much less taxed in normal operation, thus increasing the stability of the equipment carrying the movable electrodes.

Control through the supply voltage allows several adjustment principles to be put to use, the most attractive of which are respectively control of the impedance of the arc or control of power, with both principles capable of being combined in a single device.

Movement of the electrodes uses the same principle of control in continuous operation but with a lower gain or even a dead zone within a certain offset between the index quantity and the measured quantity, and a much slower response dynamic. More simply, it may be reduced to voltage control. When the scrap iron collapses, a very rapid movement of the electrodes can naturally be ordered.

BRIEF DESCRIPTION OF THE DRAWINGS

A more complete appreciation of the invention and many of the attendant advantages thereof will be readily obtained as the same becomes better understood by reference to the following detailed description when considered in connection with the accompany-drawings, wherein.

DETAILED DESCRIPTION OF THE PREFERRED EMBODIMENTS

Figure 1:
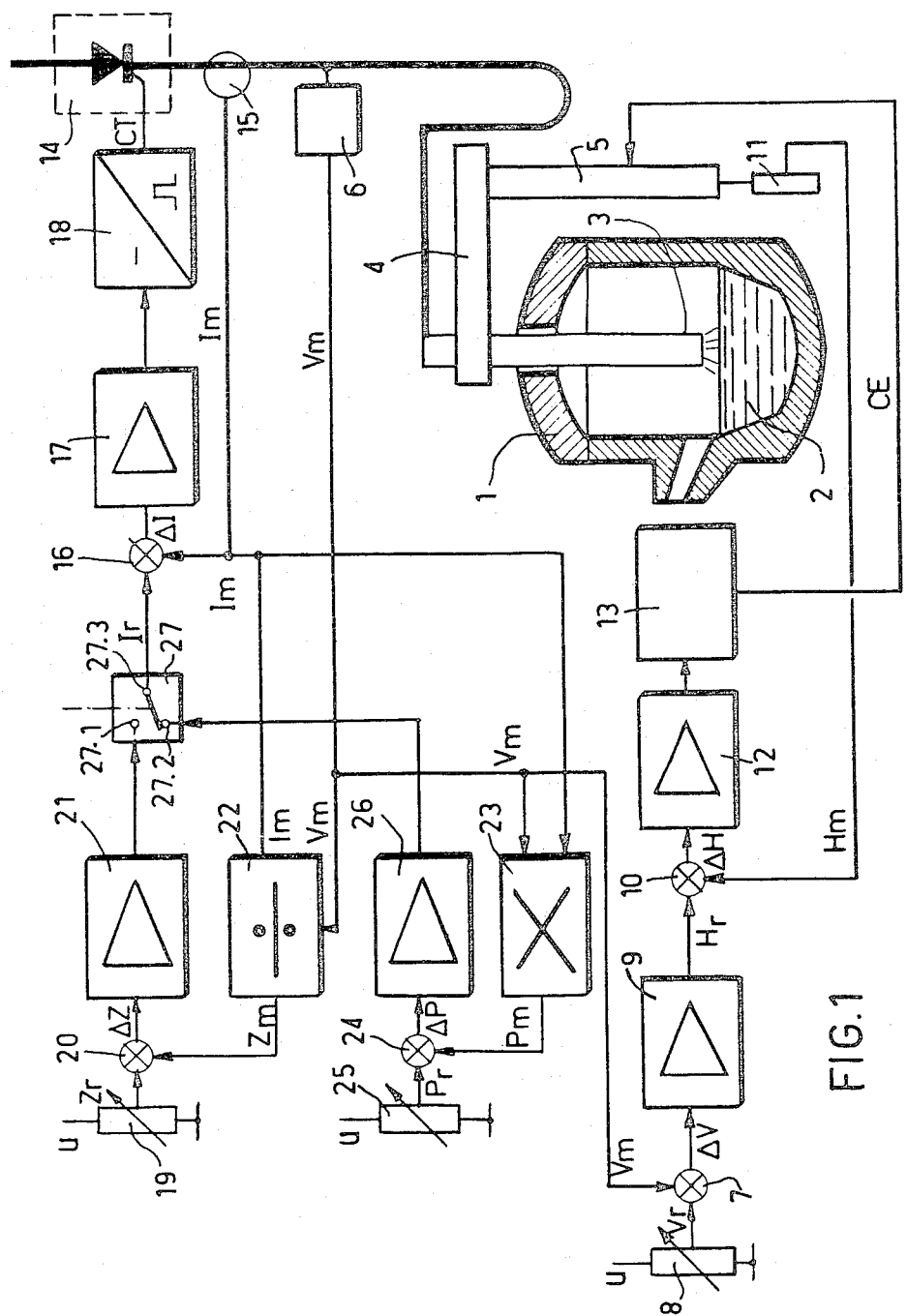
FIG. 1 illustrates schematically a device according to the present invention, combining electrode position control with arc supply voltage control.

Referring now to the drawings, wherein like reference numerals designate identical or corresponding parts throughout the several views, and more particularly to FIG. 1 thereof, a device utilizing the process of the present invention is schematically illustrated wherein electrode position control is combined with control of the power supply of the arc. FIG. 1 shows a furnace 1 having only a single electrode 3. Nevertheless, it is understood that the same control may be applied to a furnace having several electrodes. Similarly, the supply of the electrode has been represented in completely schematic fashion, with the principles of the embodiment described with reference to FIG. 1 being equally as applicable to a furnace supplied with alternating current as to one fed with direct current.

As shown in the figure, an initial control consists of adjusting the position of the electrode 3 in the furnace 1, within which is located a bath of melting metal 2. To do this, the electrode 3 is supported in a known fashion by a movable arm 4, which may be displaced by means of a positioning element 5 which may equally well consist of mechanical, electrical, or hydraulic means, or of a combination of these various types of means.

A signal representing the arc voltage Vm is obtained in a known fashion by a sensor 6 connected to a specified point on the power conductor of the electrode 3. Potential drops between this measurement point and the arc can be taken into consideration in order to obtain a signal which will be the exact image of the voltage of the arc itself. The signal Vm is applied to one input of a mixer 7, the second input of which receives a reference voltage signal Vr provided by any appropriate device, e.g., by a potentiometer 8 disposed between ground and a continuous supply voltage U. It follows naturally that the value of Vr must be chosen as a function of the conditions of use and may be imposed just as well by an operator as by an automatic process control automaton.

The mixer 7 produces a signal ΔV representing the offset between the measured arc voltage Vm and the reference voltage Vr. The offset signal ΔV is applied to a controller 9, consisting of an amplifier equipped with appropriate corrector systems, which amplifies the signal so as to produce a position reference signal Hr. The latter is applied to one input of a mixer 10, the other input of which receives a measurement signal Hm representing the position of the electrode 3. The position signal Hm is produced by a position detector 11 of any known type. The position offset signal ΔH produced at the output of mixer 10 is applied to a position controller 12, the output of which is connected to a power amplifier 13. A signal CE is obtained at the output of the latter for controlling the positioning element 5. Therefore, this first control loop enables the electrode 3 of the arc furnace to be positioned by taking into account the measured arc voltage, the position of the electrode, and a reference voltage for the arc.

According to the present invention, this electrode movement control is combined with direct electrical control of the supply voltage. For this purpose, a thyristor assembly 14 is used, as represented schematically in FIG. 1. The exact arrangement of this assembly depends on several factors, including the type of furnace, number of electrodes, type of power supply, and other criteria, such as construction cost criteria. Various embodiments are described below, with reference to the other attached figures.

As shown in FIG. 1, the thyristor gates of the thyristor assembly 14 are controlled by signals CT so as to cause the voltage applied to the electrode to vary. In the embodiment illustrated in FIG. 1, a primary control, consisting of impedance or power control, has been combined with a secondary control consisting of current control. This secondary control loop, enabling a limitation of the current, is a factor for enhancing the stability of the operating mechanism. In addition, it is also possible, under certain operating conditions, to use simple current control.

As shown in FIG. 1, a sensor 15, placed in any appropriate manner within the supply circuit, measures the real level of the arc current Im. The signal Im is applied to one input of a mixer 16, the other input of which receives an arc current reference signal Ir produced preferably by a primary controller which will be described below. The offset ΔI between the measured current Im and the reference current Ir is amplified by a current controller 17, the output of which is applied to a control circuit 18. The circuit 18 produces pulses which are delayed as a function of the value of the direct signal applied to its input, so as to provide each thyristor of the thyristor assembly 14 with control pulses CT which determine the moment of excitation of the thyristor during its conduction period.

Primary control may take the form of impedance control or power control. In the case of impedance control, an arc impedance reference signal Zr, provided for example by a potentiometer 19 disposed between a supply voltage U and ground, is compared in a mixer 20 with a measured impedance Zm. The offset ΔZ between the measured and reference signals representing impedance is amplified by a controller 21, which produces as its output a signal serving as an arc current reference signal Ir. The signal Zm representing the measured impedance is provided by a circuit 22 which, in known fashion, computes the ratio between the measured voltage Vm and the level of the measured current Im.

In the case where arc power control is desired, a signal Pm representing measured power is produced by a circuit 23, which computes the product of the measured arc voltage Vm and the measured level Im of the arc current. The signal Pm is applied to one input of a mixer 24, the other input of which receives a power reference signal Pr provided, for example, by a potentiometer disposed between ground and a supply voltage U. The power offset signal ΔP produced by the mixer 24 is amplified by a controller 26. The outputs of controllers 21 and 26 are connected respectively to input terminals 27.1 and 27.2 of a switch 27. The output terminal 27.3 of the switch 27 is connected to the mixer 16 so as to supply the current reference signal Ir.

Depending on the position of the switch 27, the device uses either an impedance or a power control. The choice between these two forms of control is made as a function of operating conditions. Activation of switch 27 may be automatic. In this case it may be controlled by a process control automaton or by threshold detectors enabling power and impedance to be simultaneously maintained within set bands. The device described schematically with reference to FIG. 1 is essentially intended to illustrate one of the essential characteristics of the invention, i.e., the combination of electrode position control with power supply control. Of course the various controls may, in their embodiments, be the object of multiple variations.

When the furnace comprises several electrodes, one control device, such as described in FIG. 1, is preferably used for each electrode.

FIGS. 2 through 5 are schematic illustrations of examples described for the sole purpose of illustrating the possibility of applying the process of the present invention using well known means presently used in other applications, e.g., in connection with resistance-furnaces or variable speed motors.

Figure 2:
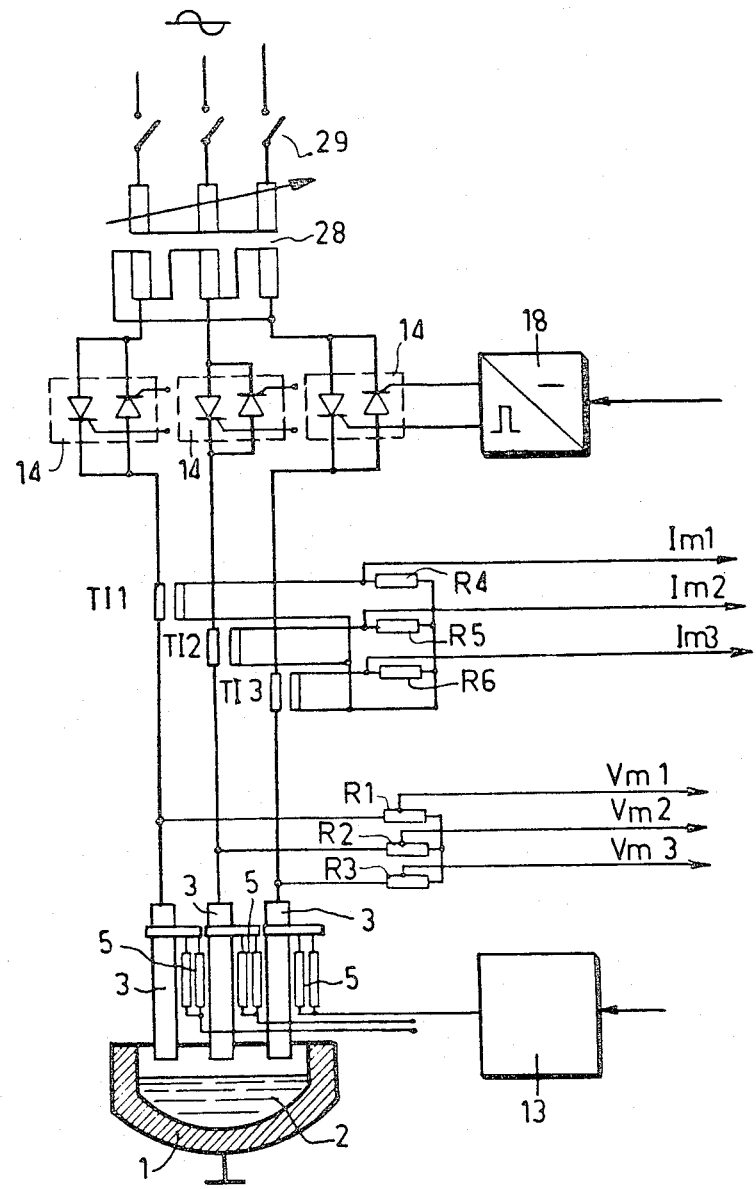
FIG. 2 illustrates schematically a sample application of the present invention to an arc furnace fed with three-phase alternating current.

FIG. 2 represents an embodiment of the present invention applied to an arc furnace 1 having three electrodes 3 and a three-phase power supply. Each electrode is positioned by an element 5 which is controlled by a power amplifier 13, of which only one is illustrated. The furnace 1 is fed by a transformer 28 protected by a breaker 29. In the example shown, this transformer is equipped, at its primary winding, with a contact switch intended to vary the voltage as a function of the operating conditions. It is obvious that the presence of the thyristor assemblies 14 used for controlling the voltage in accordance with the present invention may, in certain cases, enable elimination of the contact switch. In the embodiment shown, a thyristor assembly 14 is mounted in each phase between the secondary winding of the single transformer 28 and the electrodes 3. Each assembly 14 includes two thyristors mounted in grades, i.e., anode-to-cathode (in parallel and in opposition). Each assembly 14 is controlled by a control circuit 18, of which only one is illustrated. Each thyristor in a pair receives appropriate control pulses from the circuit 18, one during the positive voltage half-cycle and the other during the negative voltage half-cycle.

In FIG. 2, sensors intended to provide the control circuit with the values of the currents Im1, Im2, and Im3 applied to each of the electrodes, consist respectively of current transformers TI1, TI2 and TI3 and their respective resistors R4, R5, and R6, disposed in each of the phases of the supply circuit. Sensors, intended to produce voltages Vm1, Vm2, and Vm3, have been represented on each of the phases in the form of resistances R1, R2, and R3. The control loops, which are identical to the one shown in FIG. 1, have not been represented in the figure.

Figure 3:
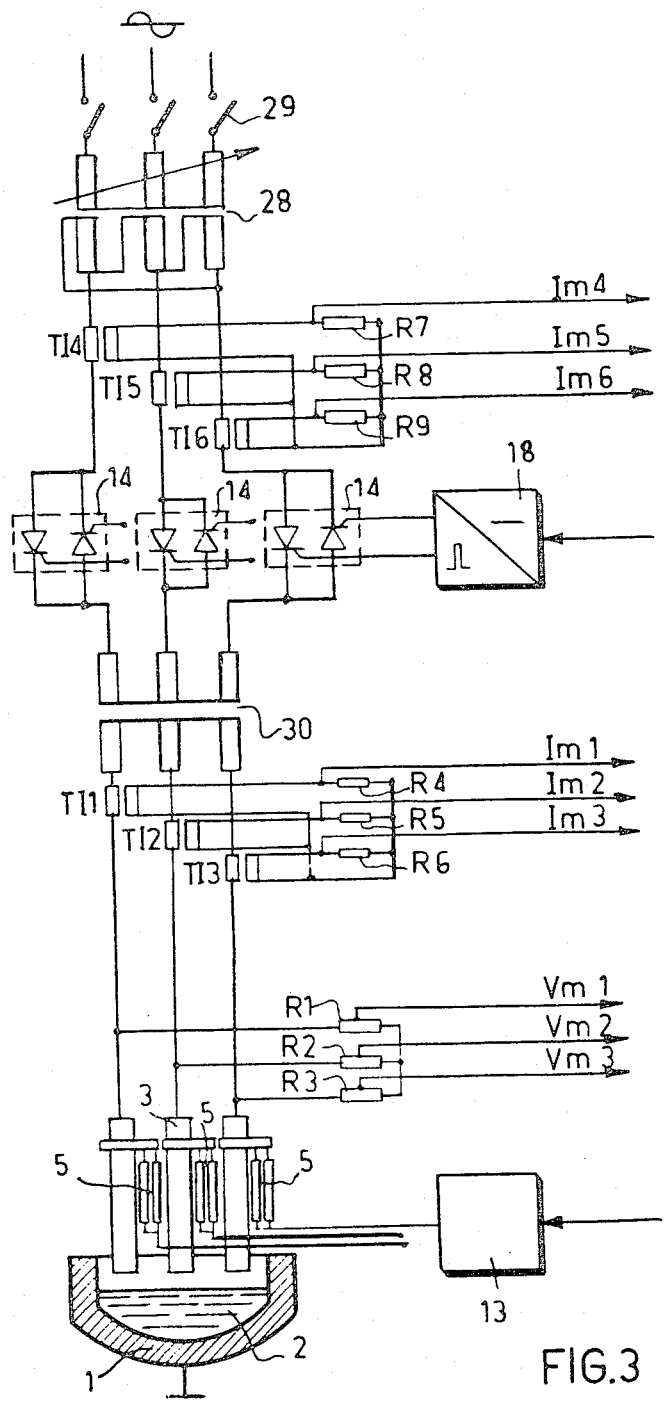
FIG. 3 illustrates another sample application of the present invention to an arc furnace fed with three-phase alternating current.

Like FIG. 2, FIG. 3 represents an embodiment of the present invention applied to a three-electrode arc furnace supplied with direct current. In this embodiment, it is desired to optimize the use of the thyristors by using them within the voltage ranges for which they are best adapted. Thus, particularly when the arc voltage must be relatively low, an auxiliary transformer 30 is used, disposed between the thyristor assemblies 14 and the electrodes 3. The thyristors are then placed at the secondary winding of supply transformer 28 and at the primary winding of auxiliary voltage matching transformer 30. Measurements of arc current Im (Im1, Im2, Im3) and arc voltage Vm (Vm1, Vm2, Vm3) are made between the secondary winding of the auxiliary transformer and the electrodes.

It is possible, as shown, to measure currents Im4, Im5, and Im6 flowing through the thyristor assemblies 14 with the aid of current transformers T14, T15 and T16 and the associated resistors R7, R8 and R9. In this case, while one of the current measuring elements serves for control, the other may be used for controlling safety devices (not shown).

Figure 4:
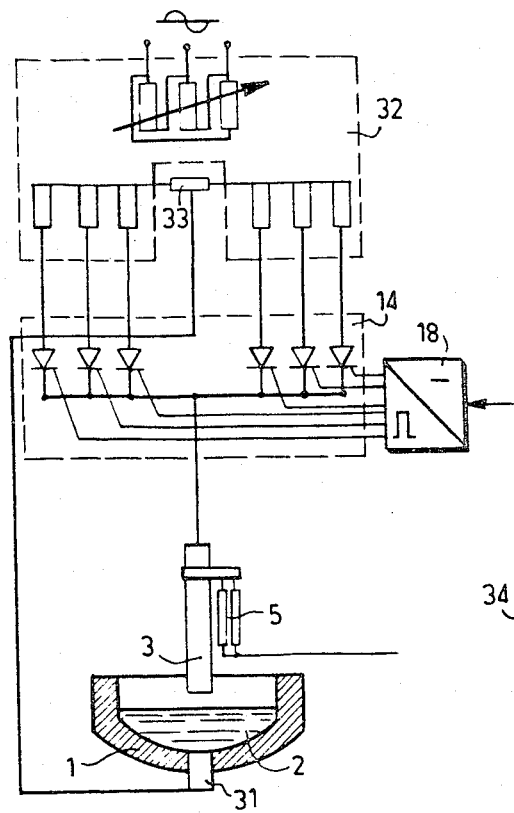
FIG. 4 is a schematic illustration of a sample application of the present invention to a direct current furnace having one electrode.

FIG. 4 is a schematic illustration of an embodiment of the present invention applied to a direct current furnace.

In the figure, furnace 1 includes a single electrode 3, positioned by an element 5. The return of the current occurs through a hearth conductor 31. Supply of the furnace from the system is achieved through a transformer 32 which is preferably equipped with a contact switch (not shown) at the primary winding. Its secondary winding is of the double-star type with an absorption coil 33, as is frequently the case in the use of thyristors for the rectification of low voltages. A thyristor assembly 14 is placed between the secondary winding of transformer 32 and a common point connected to the electrode 3, while return of the current takes place between the hearth and the mid-point of the absorbtion coil 33. When the supply occurs as shown, through a secondary winding of the double-star type, assembly 14 includes six thyristors, each disposed in series between the electrode and a winding of the secondary. In this case, all of the thyristors are controlled by a control circuit 18 which produces the necessary control pulses as a function of the arc, as described with reference to FIG. 1. The power amplifying, as well as current and voltage amplifying, elements are analogous to those described with reference to the other figures and, for the sake of clarity, have not been shown. It is possible to apply the same principle to the control of a direct current furnace comprising three electrodes. Each of them is then supplied as shown in FIG. 4. By using primary transformer windings which are appropriately out of phase, together with zig-zag couplings, for example, disturbances of the supply network may be limited.

Figure 5:
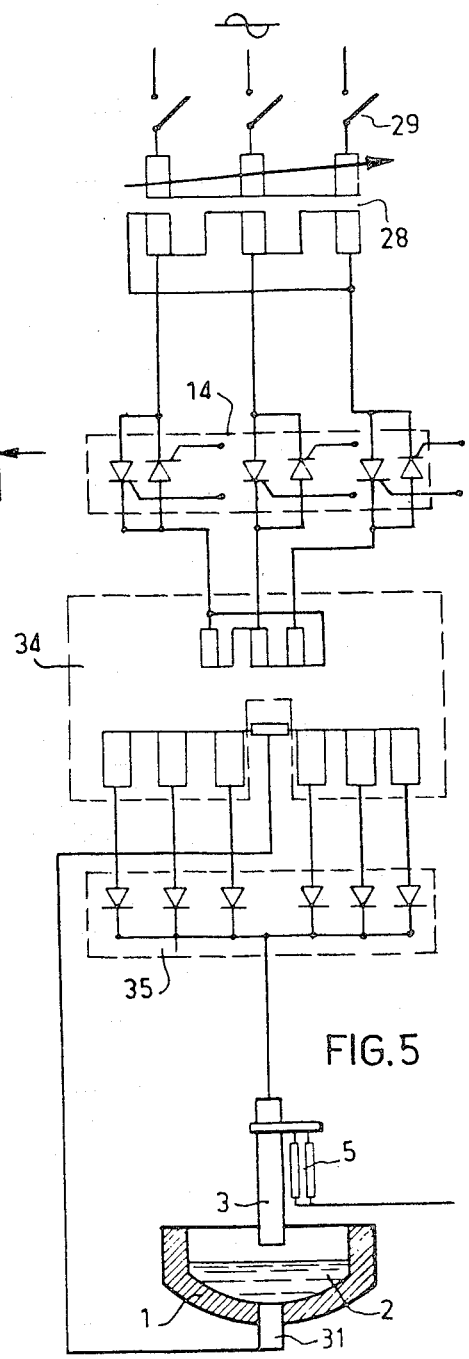
FIG. 5 illustrates another sample application of the present invention to a direct current furnace having one electrode.

FIG. 5 also illustrates an application of the present invention to a direct current furnace. As in the embodiment of FIG. 3, it is desirable to use the thyristors in appropriate voltage ranges. The assembly 14 consists of three pairs of thyristors mounted in grades at the secondary winding of a main supply transformer 28 and upstream from an auxiliary voltage matching transformer 34. The alternating voltage controlled by the thyristor is next rectified by a diode rectifier 35 disposed in the secondary circuit of the auxiliary transformer.

Obviously, numerous modification and variations of the present invention are possible in light of the above teachings. It is therefore to be understood that within the scope of the appended claims, the invention may be practiced otherwise than as specifically described herein.

FOR EXAMPLE:

several types of controls may be used, of current, voltage, impedance, power either separately or combined, since they use as final adjustment quantities the position of the electrodes, on the one hand, and, on the other, the arc supply voltage;

the process applies equally well to direct current and alternating current furnaces;

the contact switch of the transformer may be eliminated by using the possibilities for voltage offered by the thyristor converters;

the contract switch of the transformer may also be activated automatically, e.g., when the value of the ignition delay angle of the thyristor exceeds specified limits;

the thyristors may be replaced with triacs or equivalent semiconductor components;

several thyristors may be placed in parallel and/or in series, their number being determined as a function of the necessary power.

What is claimed as new and desired to be secured by Letters Patent of the United States is:

1. An arc control device for use with an arc furnace, comprising:
   at least one movable electrode located in said furnace, said at least one electrode producing an arc;
   power network means coupled to said at least one electrode for supplying DC electric power to said at least one electrode;
   first control circuit means for modifying the location of said at least one movable electrode as a function of at least one measurement signal representing a first electrical characteristic of said arc;
   thyristor converter means coupled between an output of said power network means and said at least one electrode for modifying an arc voltage of said DC electric power supplied to said at least one electrode by said power network means, said thyristor converter means including at least one thyristor having a gate; and
   second control circuit means independent of said first control circuit means, said second control circuit means having at least one output coupled to said gate of said at least one thyristor, and including as inputs at least one measurement signal representing a second electrical characteristic of said arc and a reference signal associated with said at least one measurement signal.

2. An arc control device according to claim 1, wherein:
   said first and second electrical characteristics of said arc are selected from the group consisting of impedance, power consumption, electrode current and arc voltage.

3. An arc control device according to claim 1, wherein:
   said thyristor converter means convert said electric power supplied by said power network means into direct current.

4. An arc control device according to claim 1, which further comprises:
   an auxiliary transformer including a primary winding and a secondary winding; and
   diode rectifier means for converting AC electric power into DC electric power, said rectifier means being coupled between said secondary winding of said auxiliary transformer and said at least one electrode; and
   wherein said thyristor converter means comprises:
   a plurality of thyristors, said plurality of thyristors being grouped together in pairs, each of said thyristor in each pair being coupled in parallel and in opposition to the other of said thyristor in each pair, and said plurality of thyristors being coupled to said primary winding of said auxiliary transformer.

5. An arc control device according to claim 1, wherein:
   said thyristor converter means function as static switches.

6. An arc control device for use with an arc furnace, comprising:
   at least one movable electrode located in said furnace, said at least one electrode producing an arc;
   power network means coupled to said at least one electrode for supplying DC electric power to said at least one electrode;
   first control circuit means for modifying the location of said at least one movable electrode as a function of at least one measurement signal representing a first electrical characteristic of said arc;
   thyristor converter means coupled between an output of said power network means and said at least one electrode for modifying an arc voltage of said DC electric power supplied to said at least one electrode by said power network means, said thyristor converter means including at least one thyristor having a gate; and
   second control circuit means independent of said first control circuit means, said second control circuit means having at least one output coupled to said gate of said at least one thyristor, and including as inputs at least one measurement signal representing a second electrical characteristic of said arc and a reference signal associated with said at least one measurement signal, said first and second electrical characteristics of said arc being selected from the group consisting of impedance, power consumption, electrode current and arc voltage.

7. An arc control device according to claim 6, wherein:
   said first characteristic of said arc is the arc voltage.

* * * * *